Oct. 19, 1965        J. Y. MA        3,213,253
DEFORMABLE MOLDED PLASTIC ROTOR FOR A ROTARY ELECTRIC SWITCH
Filed Dec. 18, 1962
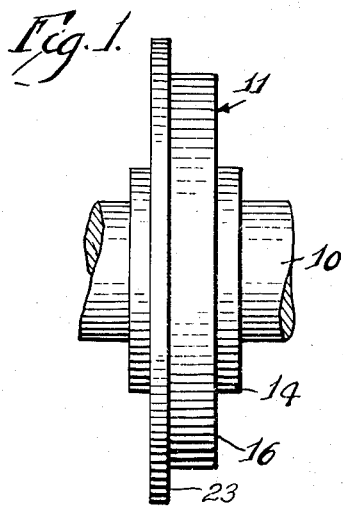
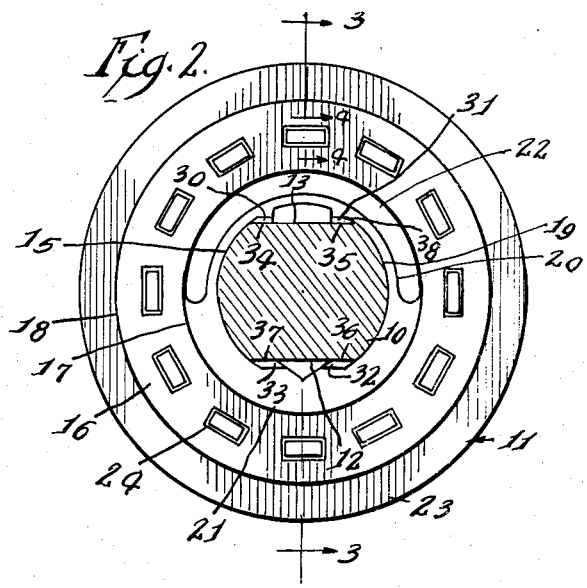
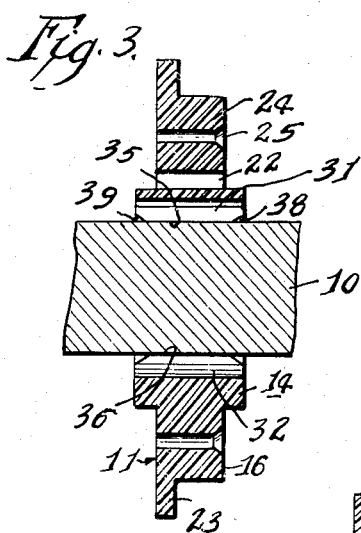
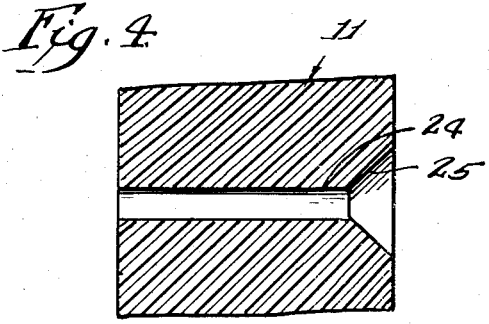
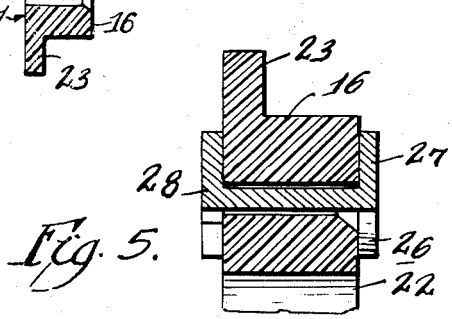
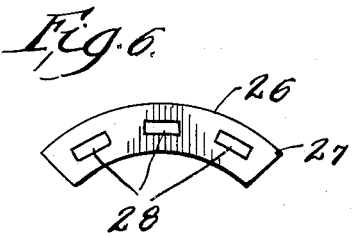
Inventor:
John Y. Ma.
By Hofgren, Brady,
Wegner, Allen & Stellman
Attorneys.

United States Patent Office 3,213,253
Patented Oct. 19, 1965

3,213,253
DEFORMABLE MOLDED PLASTIC ROTOR FOR A ROTARY ELECTRIC SWITCH
John Y. Ma, Algonquin, Ill., assignor to Oak Electro/netics Corp., a corporation of Delaware
Filed Dec. 18, 1962, Ser. No. 245,586
4 Claims. (Cl. 200—166)

This invention relates to a rotor and more specifically to an insulated rotor usable in a rotary switch and is particularly adaptable for use in switches of small size.

Current day electrical circuitry often requires utilization of rotary switches to perform a plurality of switching functions by using a single rotor. At times, multiple switch sections are mounted to a common shaft to accomplish this end. Problems are encountered in reducing the size of the switches and the components that make them up, and, in addition, working with smaller switches increases the cost due to the assembly problems and the difficulty which is encountered in handling small parts.

It is, therefore, an object of this invention to provide a substantially improved rotor for rotary switches.

It is a further object of this invention to provide an inexpensive, small rotor for a rotary switch with improved assembly characteristics.

Accordingly, it is a feature of this invention to provide a rotor for a rotary switch having a rotatable shaft, wherein the rotor comprises a hub, having a substantially cylindrical shape and having an outer surface, for mounting on said shaft; and flange having an inner surface having a circumference larger than the circumference of said outer surface; and means, joining said hub and said flange along portions of said inner and outer surfaces, for allowing said hub to deform to accommodate said shaft.

It is a further feature of this invention to provide a series of longitudinally extending locking members in said hub for engaging the shaft.

It is yet another feature of the invention to provide a tapered portion on said locking members for positioning the shaft within the hub.

Still a further feature of the invention is to provide a plurality of spaced apertures in the flange for receiving arcuate contacts.

A further feature is to provide tapered end portions of the contact receiving apertures to improve the ease of assembly of a rotary switch.

Further features and advantages will become apparent from the following detailed description taken in connection with the accompanying drawings in which like reference numerals refer to like components, and in which:

FIGURE 1 is a side view of a switch embodying the invention;

FIGURE 2 is an end view of the rotor of the switch;

FIGURE 3 is a sectional view along line 3—3 in FIGURE 2;

FIGURE 4 is an enlarged fragmentary view along line 4—4 in FIGURE 2;

FIGURE 5 shows an arcuate contact position on said rotor; and

FIGURE 6 is a rear view of an arcuate contact usable with the rotor.

Referring now to FIGURES 1 through 6, there is generally provided a shaft 10 and an insulated rotor 11. In this instance, the shaft 10 has a "double-D" cross-sectional configuration which includes first and second substantially parallel surfaces 12 and 13 whose purpose will be discussed hereinafter.

The rotor 11 has a hub 14 of generally cylindrical shape having an aperture 15 extending therethrough. A flange 16 is provided which has a generally annular shape and includes an inner surface 17 and an outer surface 18. Similarly, the hub has inner and outer surfaces designated as 19, 20. Positioned between the inner surface 17 of flange 16, and the outer surface 20 of hub 14 is a portion 21 of the rotor 11 joining the two. In this instance, the joining portion is a sprocket extending substantially half-way about the periphery of hub 14. With this construction, an arcuate opening 22 exists between flange 16 and hub 14. There is provided, in addition, a second flange 23 extending substantially all the way around flange 16 for added strength.

The material which forms the hub, the first and second flanges, and the spoke or joining portion is an insulating material and serves to support a plurality of electrical contacts for completing switching circuits. A number of substantially rectangularly shaped apertures 24 extend through flange 16 and provide for mounting electrical contacts. The ends of the rectangular apertures have a tapered portion 25, as shown in detail in FIGURE 4. An arcuate contact 26, shown in FIGURE 6, is one type of contact usable with the rotor. It includes the arcuate portion 27 and a plurality of mounting means or legs 28 of substantially rectangular cross section extending from the arcuate portion. The spacing between adjacent legs is substantially equal to the distance between adjacent apertures and permits insertion of the support legs therein. The tapered portion 25 allows for guiding the suport legs into the rectangular apertures. Once the arcuate section is in place, the rearward portions of legs 28 are bent upwardly to hold the arcuate contact firmly in place. A mounted contact is shown in detail in FIGURE 5. The rotor configuration is particularly adapted for use in a rotary wafer switch and is well suited for "ganged" switch assemblies. As is well known in the art, stators with electrical contacts would be combined in the final assembly and external circuits connected thereto. Rotation of the shaft performs the switch operation.

Hub 14 has formed on its inner periphery a plurality of longitudinally extending locking members 30, 31, 32, and 33. Members 30 and 31 are positioned so that they have two faces 34 and 35 which lie substantially in the same plane. In a similar manner, members 32 and 33 have a pair of faces 36 and 37 in approximately the same plane. The planes of the two sets of faces are substantially parallel and serve to mate with the parallel faces of shaft 10.

In addition, there is provided on the locking members tapered end portions 38, 39 as shown in FIGURE 3, it being understood that each of the locking members has such tapered end portions.

In assembling the rotor on the shaft, the tapered portions on the locking members allow the shaft to enter the hub and provide an inclined surface against which the shaft may be urged to expand the upper portion of hub 14. This is possible because of arcuate slot 22. The stresses in the hub lock the hub with respect to the shaft so that turning of the shaft also turns the hub and rotor, and, in addition, provides a frictional force which retains the rotor at a fixed position on the shaft with respect to the ends thereof.

I claim:

1. In a rotary switch, a shaft and a rotor, said rotor comprising a generally cylindrical hub portion of deformable material having an outer surface and an inner surface defining an aperture with an effective circumference smaller than the effective circumference of said shaft, said hub being mounted on said shaft, a peripheral disc portion surrounding and generally coaxial with said hub, said disc portion having an inner surface spaced from the outer surface of said hub, and means joining said hub and disc portions along only a portion of the inner surface of the peripheral disc and the outer surface of the hub, an annular segment of said hub being free from radial restraint, said segment of the hub portion expanding to accommodate insertion of said shaft into the hub portion.

2. The switch rotor of claim 1 wherein said hub and disc portions are joined along substantially 180° of their surfaces leaving 180° of the hub free to expand radially.

3. The switch rotor of claim 1 including locking means formed on the inner surfaces of said hub.

4. The switch rotor of claim 1 in which said hub portion, said disc portion and said joining means comprise a unitary body of plastic material.

References Cited by the Examiner
UNITED STATES PATENTS

| | | | |
|---|---|---|---|
| 2,193,223 | 3/40 | Chayne et al. | 200—61.56 |
| 2,809,243 | 10/57 | Marx | 200—25 |
| 2,864,967 | 12/58 | Redick et al. | 200—19 |
| 2,912,528 | 11/59 | Wall | 200—8 |
| 2,953,938 | 9/60 | Bush | 200—24 |

BERNARD A. GILHEANY, *Primary Examiner.*